(12) United States Patent
Nakamura et al.

(10) Patent No.: US 9,063,533 B2
(45) Date of Patent: Jun. 23, 2015

(54) MULTI-SPINDLE TRANSLATION CONTROL FOR MULTIPLE COORDINATE SYSTEMS

(75) Inventors: Naoki Nakamura, Chiyoda-ku (JP); Ushio Fukuichi, Chiyoda-ku (JP); Tomonori Sato, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 541 days.

(21) Appl. No.: 13/260,048

(22) PCT Filed: Mar. 27, 2009

(86) PCT No.: PCT/JP2009/001380
§ 371 (c)(1),
(2), (4) Date: Sep. 23, 2011

(87) PCT Pub. No.: WO2010/109536
PCT Pub. Date: Sep. 30, 2010

(65) Prior Publication Data
US 2012/0022682 A1    Jan. 26, 2012

(51) Int. Cl.
*G06F 19/00* (2011.01)
*G05B 19/18* (2006.01)

(52) U.S. Cl.
CPC .................................... *G05B 19/182* (2013.01)

(58) Field of Classification Search
None
See application file for complete search history.

(56) References Cited

U.S. PATENT DOCUMENTS 3,935,642 A * 2/1976 Russell ............................ 33/302
4,058,033 A * 11/1977 Lahm et al. ..................... 82/121
4,118,844 A * 10/1978 Matsuzaki et al. ............ 29/27 C
4,186,529 A * 2/1980 Huffman ........................... 451/4
RE31,288 E * 6/1983 Matsuzaki et al. ............ 29/27 C
4,443,929 A * 4/1984 Bayer et al. ..................... 483/32
4,445,776 A * 5/1984 Hyatt ............................... 355/78
4,598,380 A * 7/1986 Holmes et al. ................ 700/251
4,692,856 A * 9/1987 Komiya ......................... 700/169

(Continued)

FOREIGN PATENT DOCUMENTS

JP  60-230207 A  11/1985
JP  63-192107 A  8/1988

(Continued)

OTHER PUBLICATIONS

Kennedy, B., "Multi-Axis Access, Simplified Application of Five Machining Axes Produces Big Cost Savings in Routine Part Making", Jan. 2011, Cutting Tool Engineering, vol. 63, Iss. 1.*

(Continued)

*Primary Examiner* — Mohammad Ali
*Assistant Examiner* — Kelvin Booker
(74) *Attorney, Agent, or Firm* — Sughrue Mion, PLLC; Richard C. Turner

(57) ABSTRACT

A numerical control device according to the invention is a numerical control device for a multi-spindle machine tool including a rotation axis and controlling a tool attitude relative to a machining workpiece, including a first storage device capable of recording a machining program; a second storage device capable of storing coordinate systems; and a central processing unit capable of executing the machining program, selecting a coordinate system suitable for machining from among the coordinate systems stored in the second storage device based on the tool attitude set by the machining program or an external input, and outputting data for machining the workpiece on the selected coordinate system.

6 Claims, 8 Drawing Sheets

(56) References Cited

U.S. PATENT DOCUMENTS

| | | | |
|---|---|---|---|
| 5,020,402 A * | 6/1991 | Link et al. | 82/124 |
| 5,022,293 A * | 6/1991 | Farkas et al. | 82/1.11 |
| 5,083,485 A * | 1/1992 | Link et al. | 82/124 |
| 5,097,587 A * | 3/1992 | Yasuda | 483/6 |
| 5,144,740 A * | 9/1992 | Yasuda | 483/4 |
| 5,243,266 A * | 9/1993 | Kasagami et al. | 318/568.1 |
| 5,337,249 A * | 8/1994 | Fujita et al. | 700/180 |
| 5,353,386 A * | 10/1994 | Kasagami et al. | 700/247 |
| 5,545,959 A * | 8/1996 | Otsuki et al. | 318/568.15 |
| 5,608,618 A * | 3/1997 | Kosaka et al. | 700/61 |
| 5,815,400 A * | 9/1998 | Hirai et al. | 700/173 |
| 5,996,329 A * | 12/1999 | Cardenas | 29/48.5 R |
| 6,311,591 B1 * | 11/2001 | Grossmann | 82/121 |
| 6,587,747 B2 * | 7/2003 | Hirai et al. | 700/189 |
| 6,729,936 B1 * | 5/2004 | Hori et al. | 451/8 |
| 6,815,917 B2 * | 11/2004 | Fujinawa | 318/560 |
| 6,847,857 B2 * | 1/2005 | Sugie | 700/160 |
| 6,934,601 B2 * | 8/2005 | Hirai et al. | 700/194 |
| 6,999,845 B2 * | 2/2006 | Hirai et al. | 700/189 |
| 7,179,025 B2 * | 2/2007 | Kreh | 409/26 |
| 7,283,889 B2 * | 10/2007 | Otsuki et al. | 700/186 |
| 7,480,541 B2 * | 1/2009 | Endo et al. | 700/186 |
| 7,551,974 B2 * | 6/2009 | Wakazono | 700/96 |
| 7,552,002 B2 * | 6/2009 | Endo et al. | 701/50 |
| 7,568,867 B2 * | 8/2009 | Bryan | 409/230 |
| 8,131,396 B2 * | 3/2012 | Yamada | 700/189 |
| 8,786,243 B2 * | 7/2014 | Mori et al. | 318/632 |
| 2001/0024075 A1 * | 9/2001 | Caamano | 310/254 |
| 2001/0032056 A1 * | 10/2001 | Tanaka et al. | 702/90 |
| 2002/0002420 A1 * | 1/2002 | Hirai et al. | 700/187 |
| 2003/0187542 A1 * | 10/2003 | Endo et al. | 700/186 |
| 2003/0200005 A1 * | 10/2003 | Hirai et al. | 700/187 |
| 2003/0204287 A1 * | 10/2003 | Shirakawa et al. | 700/193 |
| 2004/0100218 A1 * | 5/2004 | Fujinawa | 318/571 |
| 2004/0105731 A1 * | 6/2004 | Kreh | 409/51 |
| 2004/0128018 A1 * | 7/2004 | Sugie | 700/160 |
| 2004/0181307 A1 * | 9/2004 | Hirai et al. | 700/194 |
| 2005/0042052 A1 * | 2/2005 | Nakazato et al. | 409/80 |
| 2005/0055128 A1 * | 3/2005 | Hirai et al. | 700/194 |
| 2005/0107000 A1 * | 5/2005 | Otsuki et al. | 451/5 |
| 2005/0209712 A1 * | 9/2005 | Sagasaki et al. | 700/28 |
| 2006/0086216 A1 * | 4/2006 | Zuccalli | 82/124 |
| 2006/0223686 A1 * | 10/2006 | Wakazono | 483/1 |
| 2006/0239386 A1 * | 10/2006 | Endo et al. | 375/343 |
| 2006/0241839 A1 * | 10/2006 | Endo et al. | 701/50 |
| 2007/0094914 A1 * | 5/2007 | Glynn et al. | 43/42.24 |
| 2007/0185609 A1 * | 8/2007 | Endo et al. | 700/187 |
| 2007/0276534 A1 * | 11/2007 | Takahashi et al. | 700/193 |
| 2007/0293962 A1 * | 12/2007 | Kimura et al. | 700/97 |
| 2008/0082201 A1 * | 4/2008 | Wakazono | 700/169 |
| 2008/0091296 A1 * | 4/2008 | Zacek et al. | 700/186 |
| 2008/0093094 A1 * | 4/2008 | Bryan | 173/179 |
| 2008/0114485 A1 * | 5/2008 | Katoh et al. | 700/193 |
| 2008/0214374 A1 * | 9/2008 | Sugiyama et al. | 483/54 |
| 2008/0221725 A1 * | 9/2008 | Wakazono | 700/179 |
| 2008/0288103 A1 * | 11/2008 | Otsuki et al. | 700/189 |
| 2009/0182451 A1 * | 7/2009 | Jennessen et al. | 700/188 |
| 2009/0292380 A1 * | 11/2009 | Saito | 700/98 |
| 2010/0185316 A1 * | 7/2010 | Yamada | 700/189 |
| 2010/0207567 A1 * | 8/2010 | Mori et al. | 318/632 |
| 2011/0062642 A1 * | 3/2011 | Yabe | 269/37 |
| 2011/0295422 A1 * | 12/2011 | Hasenzahl | 700/245 |
| 2012/0323373 A1 * | 12/2012 | Sato et al. | 700/275 |

FOREIGN PATENT DOCUMENTS

| | | | |
|---|---|---|---|
| JP | 05-108134 A | | 4/1993 |
| JP | 05-150816 A | | 6/1993 |
| JP | 06-222820 A | | 8/1994 |
| JP | 07-036526 A | | 2/1995 |
| JP | 2000-153483 A | | 6/2000 |
| JP | 2003-044109 A | | 2/2003 |
| JP | 2008-077352 A | | 4/2008 |
| JP | 2008-112278 A | | 5/2008 |
| JP | 2009245164 A | * | 10/2009 |

OTHER PUBLICATIONS

Zabel, A. and Kersting, P., "Optimizing NC-tool Paths for Simultaneous Five-Axis Milling Based on Multi-Population Multi-Objective Evolutionary Algorithms", 2009, Advances in Engineering Software, vol. 40, pp. 452-463.*

Liang, H., "Minimum Error Tool Path Generation Method and An Interpolator Design Technique for Ultra-Precision Multi-Axis CNC Machining", Jul. 1999, Thesis for Doctor of Philosophy at Concordia University.*

Rahman, M., "Modeling and Measurement of Multi-Axis Machine Tools to Improve Positioning Accuracy in a Software Way", Jun. 2004, Department of Mechanical Engineering at University of Oulu.*

Heidenhain, "User Manual-CNC Pilot 4290 B and Y Axis, NC Software 625 952-xx", Apr. 2010, Retrieved from the Internet at "www.heidenhain.de".*

Yamazaki Mazak Corporation, "Programming Manual for Mazatrol Matrix (for Integrex e-series)(for integrex i-series) EIA/ISO program, manual No. H740PB0056E", Jun. 2009.*

Sono, M.; Sakaida, Y.; Kawai, T. and Takeuchi, Y., "Development of Tool Setting Error Compensation Method for 5-axis Control Ultraprecision Matching", 2007, Society for Precision Engineering Academic Conference.*

Yamada, M.; Kondo, T.; Tanaka, F. and Kishinami, T., "Tilted Tool Axis Machining on 5-Axis Machine Tools", 2007, Intl. Journal of Automation Technology, vol. 1, No. 2.*

* cited by examiner

MULTI-SPINDLE TRANSLATION CONTROL FOR MULTIPLE COORDINATE SYSTEMS

CROSS REFERENCE TO RELATED APPLICATION

This application is a National Stage of International Application No. PCT/JP2009/001380 filed Mar. 27, 2009, the contents of all of which are incorporated herein by reference in their entirety.

FIELD

The present invention relates to a numerical control (NC) device that performs numerical control over a machine tool, and more particularly to a numerical control device for a multi-spindle machine tool including a rotation axis and controlling the position and attitude of a tool, and to a method of controlling the numerical control device.

BACKGROUND

A machine tool having a numerical control device incorporated therein performs machining on a workpiece while moving a movable unit to move a table on which the workpiece is mounted, or on a tool or the like. Meanwhile, a machine tool including a rotation axis can control a tool attitude relative to a machining workpiece by rotating the rotation axis. For example, the machine tool of this type often machines a plurality of machining surfaces having different normal vectors on the machining workpiece or cuts the machining surfaces themselves. When the machine tool machines machining surfaces having different normal vectors, a conventional numerical control device designates a corresponding coordinate system to each of the machining surfaces. That is, the numerical control device expresses an origin (a machining reference point), based on which a command position such as a tip position of the tool is determined by a machining program or a manual feeding device, and a coordinate axis by translation or translational motion and rotation of an arbitrary reference coordinate system (see, for example, Patent Literature 1).

Furthermore, in the case of a numerical control device according to another conventional technique, an operator of the numerical control device designates a coordinate system suitable for machining whenever switching a plurality of machining surfaces. That is, it takes the operator time and labor to, for example, select and designate a coordinate system suitable for machining from among preset coordinate systems.

CITATION LIST

Patent Literature

Patent Literature 1: Japanese Patent Application Laid-open No. 2003-044109

SUMMARY

Technical Problem

Conventional numerical control devices have the following problems. When a numerical control device changes a machining surface that is being machined at a certain time to another machining surface having a different normal vector from that of the former machining surface and machines the latter machining surface, an operator is required to perform two operations, that is, a first operation of changing the tool attitude so as to make the tool attitude perpendicular to the latter machining surface, and a second operation of either designating a coordinate system suitable for the latter machining surface or selecting the coordinate system suitable for the latter machining surface from among a plurality of preset coordinate systems.

Solution to Problem

In order to solve the aforementioned problems and attain the aforementioned object, the numerical control device for a multi-spindle machine tool including a rotation axis and controlling a tool attitude relative to a machining workpiece, is provided with: a first storage device capable of recording a machining program; a second storage device capable of recording coordinate systems; and a central processing unit capable of executing the machining program, selecting a coordinate system suitable for machining from among the coordinate systems stored in the second storage device based on the tool attitude set by the machining program or an external input, and outputting data for machining the workpiece on the selected coordinate system.

In order to solve the aforementioned problems and attain the aforementioned object, the numerical control device for a multi-spindle machine tool including a rotation axis and controlling a tool attitude relative to a machining workpiece, is provided with: a command-position generating unit that generates a translation axis position and a rotation axis angle in every control cycle based on a moving command; a coordinate-system storage unit that stores a plurality of coordinate systems; a coordinate-system selecting unit that selects a coordinate system suitable for the tool attitude from among the coordinate systems based on the rotation axis angle; a coordinate-value changing unit that changes the translation axis position to a translation axis position on the coordinate system selected by the coordinate-system selecting unit; and a coordinate transforming unit that transforms the translation axis position on the selected coordinate system into a translation axis position on a machine coordinate system based on the translation axis position on the selected coordinate system and the rotation axis angle.

In order to solve the aforementioned problems and attain the aforementioned object, the method of controlling a numerical control device for a multi-spindle machine tool including a rotation axis and controlling a tool attitude relative to a machining workpiece, the method comprising: is provided with: a step of generating a translation axis position and a rotation axis angle in every control cycle based on a moving command; a step of selecting a coordinate system suitable for the tool attitude from among a plurality of coordinate systems stored in advance based on the rotation axis angle; a step of changing the translation axis position to a translation axis position on the selected coordinate system; and a step of transforming the translation axis position on the selected coordinate system into a translation axis position on a machine coordinate system based on the translation axis position on the selected coordinate system and the rotation axis angle.

Advantageous Effects of Invention

According to the present inventions, when an operator performs an operation of changing a tool attitude so as to make the tool attitude perpendicular to a machining surface, a coordinate system suitable for the present tool attitude is automatically selected from among preset coordinate systems. Therefore, it is possible to machine the machining surfaces having different normal vectors and easily create a machining program at a low cost.

REFERENCE SIGNS LIST

1 NUMERICAL CONTROL DEVICE
2 MACHINING PROGRAM
3 MANUAL FEEDING DEVICE
4 COMMAND-POSITION GENERATING UNIT
5 COORDINATE-SYSTEM SELECTING UNIT
6 COORDINATE-SYSTEM STORAGE UNIT
7 COORDINATE-VALUE CHANGING UNIT
8 COORDINATE TRANSFORMING UNIT
9 ACCELERATION/DECELERATION PROCESSING UNIT
10 MOVABLE UNIT
11 MOVING COMMAND
12 TRANSLATION AXIS POSITION
13 ROTATION AXIS ANGLE
14 SELECTED COORDINATE SYSTEM
15 TRANSLATION AXIS POSITION ON SELECTED COORDINATE SYSTEM
16 PLURALITY OF COORDINATE SYSTEMS
17 TRANSLATION AXIS POSITION ON MACHINE COORDINATE SYSTEM
20 TOOL
21 MAIN SPINDLE HEAD
22 ROTARY TABLE
23 TOOL ATTITUDE VECTOR
30 FIRST MACHINING WORKPIECE
31 FIRST MACHINING SURFACE OF FIRST MACHINING WORKPIECE
32 SECOND MACHINING SURFACE OF FIRST MACHINING WORKPIECE
33 FIRST COORDINATE SYSTEM OF FIRST MACHINING WORKPIECE
34 SECOND COORDINATE SYSTEM OF FIRST MACHINING WORKPIECE
40 SECOND MACHINING WORKPIECE
41 FIRST MACHINING SURFACE OF SECOND MACHINING WORKPIECE
42 SECOND MACHINING SURFACE OF SECOND MACHINING WORKPIECE
43 THIRD MACHINING SURFACE OF SECOND MACHINING WORKPIECE
44 FIRST COORDINATE SYSTEM OF SECOND MACHINING WORKPIECE
45 SECOND COORDINATE SYSTEM OF SECOND MACHINING WORKPIECE
46 THIRD COORDINATE SYSTEM OF SECOND MACHINING WORKPIECE

DESCRIPTION OF EMBODIMENTS

Exemplary embodiments of the present invention will be explained below in detail with reference to the accompanying drawings. In the embodiments, a numerical control device according to the present invention is described while referring to a case of applying the numerical control device to a multi-spindle machine tool including a rotation axis and controlling the position and attitude of a tool.

First Embodiment

Figure 1:
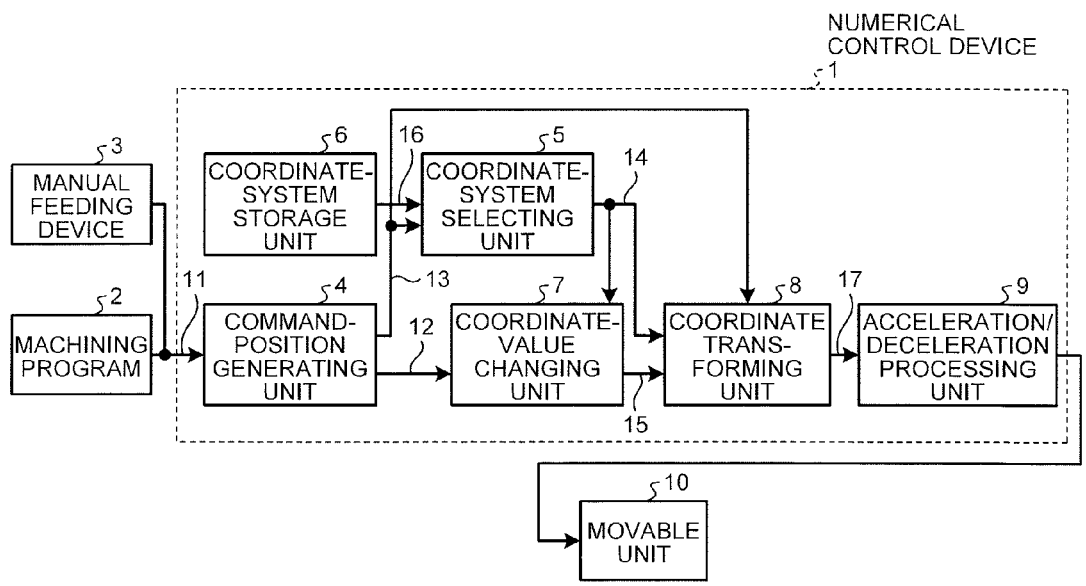
FIG. 1 is a block diagram of a configuration of a numerical control device according to a first embodiment of the present invention.

FIG. 1 is a block diagram of configurations of a numerical control device and peripheral devices thereof according to the present invention. A moving command 11 is input from a machining program 2 or a manual feeding device 3 or the like serving as an input unit to a numerical control device 1 indicated by a broken line. The machining program can be normally created by a user, input to the numerical control device 1 from outside of the numerical control device 1, and stored in a hard disk (not shown) serving as a first storage device included in the numerical control device 1. The input moving command 11 is transmitted to a command-position generating unit 4. The command-position generating unit 4 generates a translation axis position 12 and a rotation axis angle 13 in every control cycle that is a cycle in which the numerical control device 1 calculates the position and the like of the tool. The rotation axis angle 13 is transmitted to a coordinate-system selecting unit 5. The coordinate-system selecting unit 5 selects a coordinate system suitable for machining from among a plurality of coordinate systems stored in advance in a coordinate-system storage unit 6 serving as a second storage device based on a tool attitude determined by the rotation axis angle 13. The coordinate-system selecting unit 5 then transmits the selected coordinate system to a coordinate-value changing unit 7 and a coordinate transforming unit 8 as a selected coordinate system 14.

The selected coordinate system 14 and the translation axis position 12 are transmitted to the coordinate-value changing unit 7. The coordinate-value changing unit 7 changes the translation axis position 12 to a translation axis position 15 on the selected coordinate system 14 and transmits the translation axis position 15 to the coordinate transforming unit 8. The coordinate transforming unit 8 performs a coordinate transformation to transform the rotation axis angle 13 and the translation axis position 15 on the selected coordinate system 14 into a translation axis position 17 on a machine coordinate system, and transmits the translation axis position 17 to an acceleration/deceleration processing unit 9. The acceleration/ deceleration processing unit 9 performs an acceleration/deceleration process on the translation axis position 17 on the machine coordinate system, and transmits a signal to a movable unit 10 as data output from the numerical control device 1, thereby driving the movable unit 10. In FIG. 1, it is a CPU (Central Processing Unit) or the like that normally executes the machining program 2 and that performs processes involved with the numerical control device 1.

Figure 2:
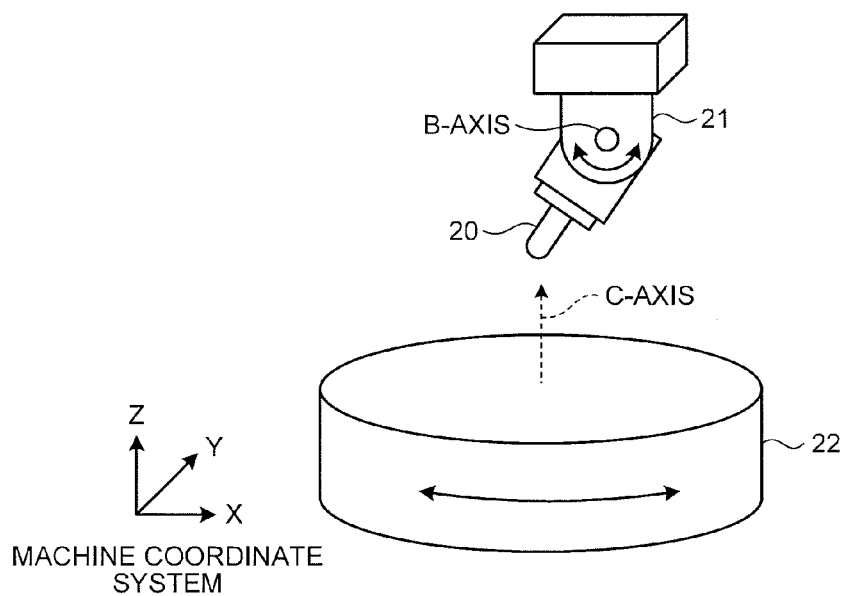
FIG. 2 is a schematic diagram of an outline of a multi-spindle machine tool according to the first embodiment of the present invention.

An operation performed by the numerical control device 1 is described next. FIG. 2 is a schematic diagram of an outline of a multi-spindle machine tool to which the numerical control device 1 according to the first embodiment is applied. This multi-spindle machine tool includes a main spindle head 21 that is provided with a tool 20 and that rotates about a B-axis. The multi-spindle machine tool also includes a rotary table 22 that rotates about a C-axis and that mounts thereon a machining workpiece (not shown) serving as a to-be-machined workpiece. The rotary table 22 moves in a translation axis direction of a predetermined machine coordinate system. Through these operations, the multiple-spindle machine tool machines the machining workpiece. That is, the multiple-spindle machine tool is a machine tool capable of controlling an attitude of the tool 20 relative to the machining workpiece. Note that a servo amplifier and a servomotor (not shown) for moving the main spindle head 21 and the rotary table 22 constitute the movable unit 10 according to the first embodiment. While the first embodiment is described assuming that the multiple-spindle machine tool has a mechanical configuration shown in FIG. 2, a machine tool having any other mechanical configuration is applicable as long as the machine tool includes a rotation axis and can control the attitude of the tool 20 relative to the machining workpiece.

Figure 3:
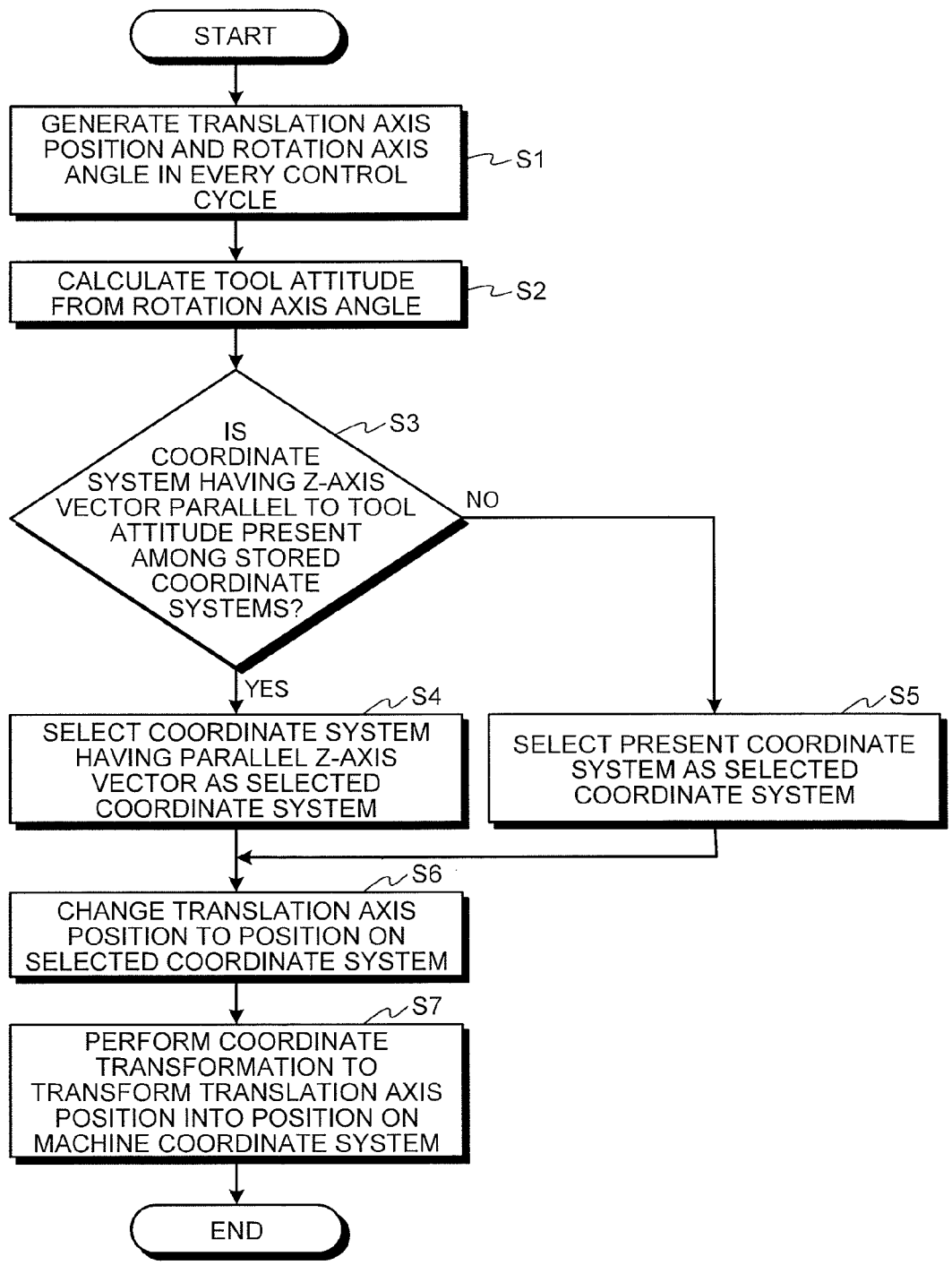
FIG. 3 is a flowchart of an example of process procedures of the numerical control device according to the first embodiment of the present invention.

FIG. 3 is a flowchart of an example of process procedures of the numerical control device 1 according to the first embodiment. The operation performed by the numerical control device 1 is described with reference to FIG. 3. First, after the moving command 11 is input from the machining program 2 or the manual feeding device 3 or the like to the numerical control device 1, the command-position generating unit 4 generates the translation axis position 12 and the rotation axis angle 13 in every control cycle (Step S1). After the command-position generating unit 4 transmits the rotation axis angle 13 to the coordinate-system selecting unit 5, the coordinate-system selecting unit 5 calculates the tool attitude relative to the machining workpiece based on the rotation axis angle 13 (Step S2).

Figure 4A:
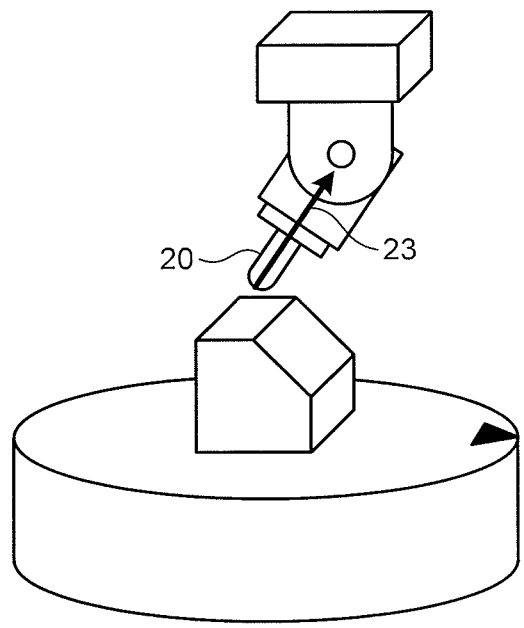
FIG. 4 are explanatory diagrams of a tool attitude vector in the first embodiment of the present invention.
Figure 4B:
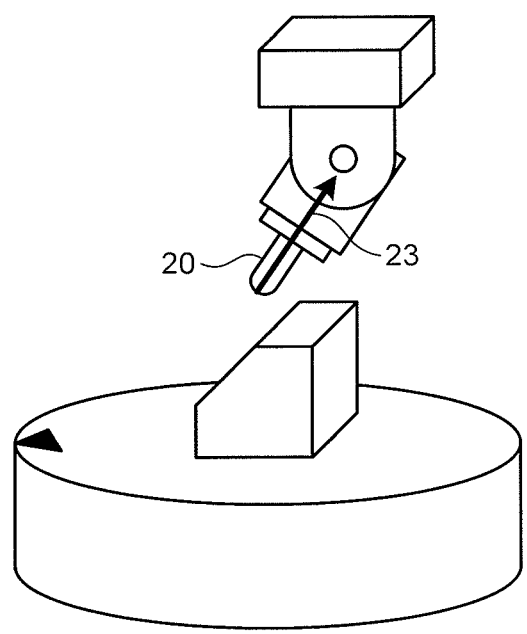

The tool attitude is described next. While the tool attitude is normally expressed by a tool attitude vector or the rotation axis angle itself, a case of expressing the tool attitude by the tool attitude vector is described in the first embodiment. FIG. 4 are explanatory diagrams of the tool attitude vector. FIG. 4A depicts a tool attitude vector when the C-axis is at 0 degree and FIG. 4B depicts a tool attitude vector when the C-axis is at 180 degrees. In FIG. 4, a unit vector in an axial direction of the tool 20 from the tip of the tool 20 to the root of the tool 20 corresponds to a tool attitude vector 23. The axial direction of the tool varies according to a type of the tool. For example, when the tool 20 is a rotary tool, the tool axial direction is a direction of the rotation axis. When the tool 20 is a cutting tool, the tool axial direction is a direction from an edge along a tool axis.

The tool attitude vector 23 is expressed as a vector viewed from the machining workpiece. That is, because the tool attitude vectors 23 shown in FIGS. 4A and 4B are equal in B-axis rotation angle, but different in C-axis rotation angle, the tool attitude vectors 23 shown in FIGS. 4A and 4B differ in direction viewed from the machining workpiece. Therefore, the tool attitude vector 23 shown in FIG. 4A differs from the tool attitude vector 23 shown in FIG. 4B. Specifically, provided that the tool attitude vector 23 is r=(i, j, k), a rotation angle of the B-axis is $\theta_B$, and a rotation angle of the C-axis is $\theta_C$ in the first embodiment, components i, j, and k of the tool attitude vector 23 are expressed by Equations (1), (2), and (3), respectively.

$$i = \sin\theta_B \cdot \sin\theta_C \quad (1)$$

$$j = \sin\theta_B \cdot \sin\theta_C \quad (2)$$

$$k = \cos\theta_B \quad (3)$$

After calculating the tool attitude vector 23, a plurality of coordinate systems 16 are transmitted to the coordinate-system selecting unit 5 from the coordinate-system storage unit 6. The user registers the coordinate systems 16 in the coordinate-system storage unit 6 in advance. The coordinate-system selecting unit 5 determines whether a coordinate system having a Z-axis vector parallel to the tool attitude vector 23 is present among the input coordinate systems 16 (Step S3).

A method of determining whether a coordinate system having a Z-axis vector parallel to the tool attitude vector 23 is present among the input coordinate systems 16 at Step S3 is specifically described. The coordinate-system selecting unit 5 compares the Z-axis vector of each of the coordinate systems 16 transmitted from the coordinate-system storage unit 6 with the tool attitude vector 23 to determine whether the Z-axis vector is parallel to the tool attitude vector 23. When a Z-axis vector parallel to the tool attitude vector 23 is present as a result of the comparison, the coordinate-system selecting unit 5 outputs the coordinate system having the Z-axis vector parallel to the tool attitude vector 23 as the selected coordinate system 14 (Step S4). On the other hand, no coordinate system having the Z-axis vector parallel to the tool attitude vector 23 is present even after comparison of Z-axis vectors of all the transmitted coordinate systems with the tool attitude vector 23, the coordinate-system selecting unit 5 outputs a present coordinate system as the selected coordinate system 14 (Step S5).

Figure 5:
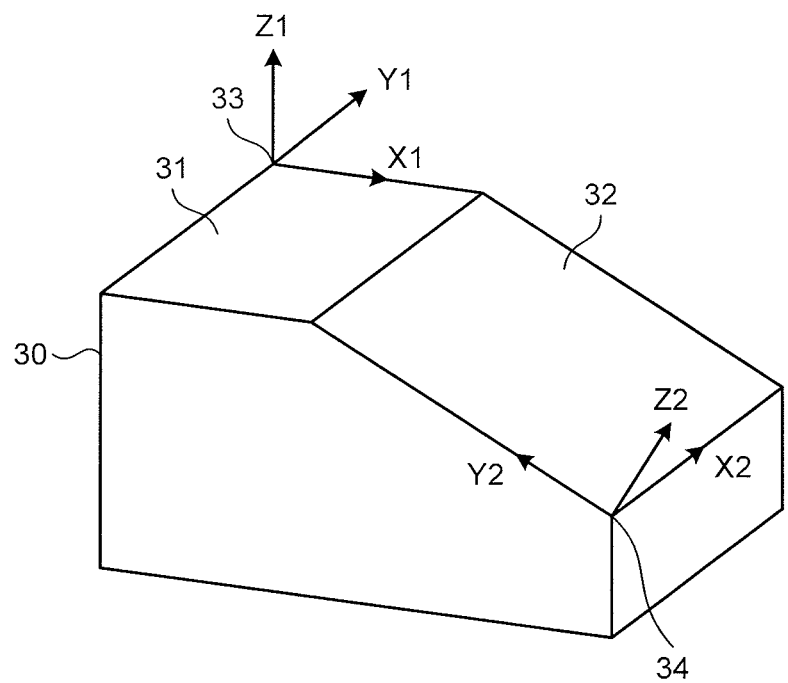
FIG. 5 is an example of a machining workpiece according to the first embodiment of the present invention.
Figure 6A:
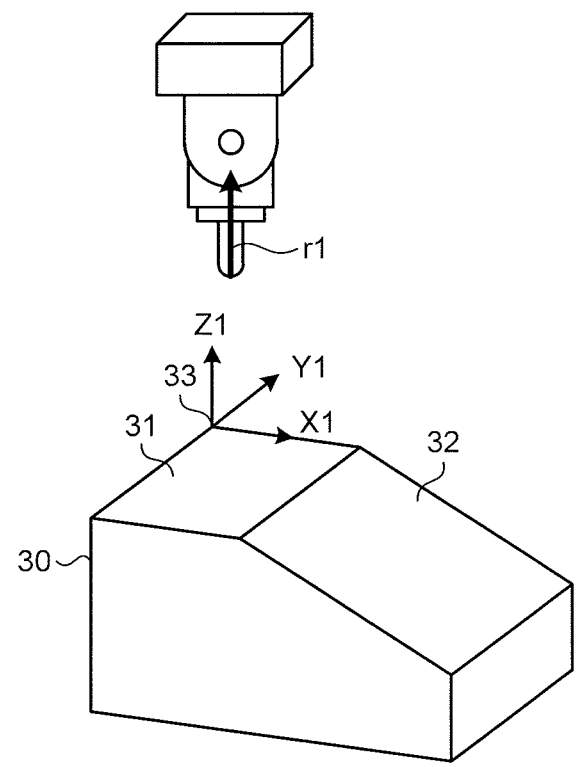
FIG. 6 depict a relationship between a machining workpiece and a tool attitude in the first embodiment of the present invention.
Figure 6B:
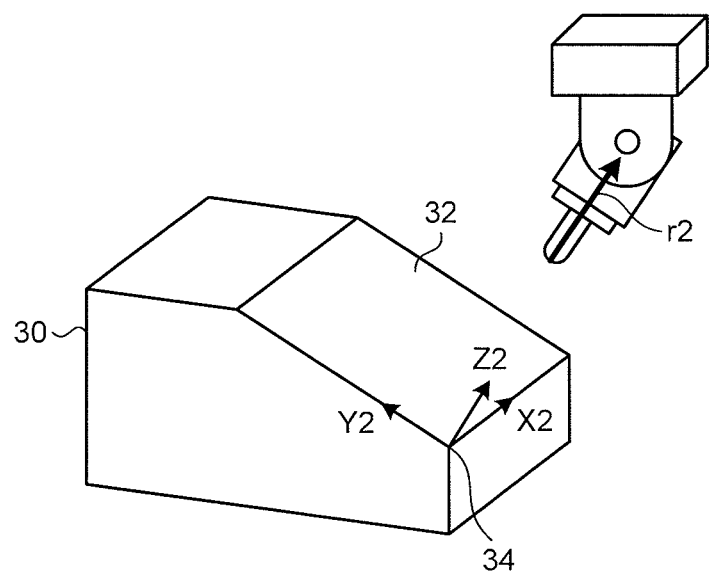

A relationship among the machining surface of the machining workpiece, the selected coordinate system 14, and the tool attitude is specifically described with reference to the drawings. FIG. 5 is an example of a first machining workpiece according to the first embodiment. In FIG. 5, a first coordinate system 33 for machining a first machining surface 31 of a first machining workpiece 30 and a second coordinate system 34 for machining a second machining surface 32 are set to the numerical control device 1, that is, stored in the coordinate-system storage unit 6. FIG. 6 depict a relationship between the machining workpiece and a tool attitude in the first embodiment. FIG. 6A depicts a relationship when the tool attitude vector is r1, and FIG. 6B depicts a relationship when the tool attitude vector is r2. In FIG. 6A, the tool attitude vector r1 is parallel to a Z-axis vector Z1 of the first coordinate system 33. Accordingly, the first coordinate system 33 is selected as the selected coordinate system 14 from among the coordinate systems 16. In FIG. 6B, the tool attitude vector r2 is parallel to a Z-axis vector Z2 of the second coordinate system 34. Due to this, the second coordinate system 34 is selected as the selected coordinate system 14 from among the coordinate systems 16.

The coordinate-system selecting unit 5 transmits the selected coordinate system 14 to the coordinate-value changing unit 7. The coordinate-value changing unit 7 changes the translation axis position 12 transmitted from the command-position generating unit 4 to the translation axis position 15 on the selected coordinate system 14 (Step S6). When the coordinate system of the translation axis position 12 is equal to the selected coordinate system 14, that is, when the coordinate-system selecting unit 5 determines, for example, that no coordinate system having a Z-axis vector parallel to the tool attitude vector 23 is present, the coordinate-value changing unit 7 uses the translation axis position 12 as the translation axis position 15 on the selected coordinate system 14 without changing the translation axis position 12.

The coordinate-value changing unit 7 transmits the translation axis position 15 on the selected coordinate system 14 to the coordinate transforming unit 8. The coordinate transforming unit 8 performs a coordinate transformation to transform the translation axis position 15 transmitted from the coordinate-value changing unit 7 into the translation axis position 17 on the machine coordinate system based on the selected coordinate system 14 transmitted from the coordinate-system selecting unit 5 and the rotation axis angle 13 transmitted from the command-position generating unit 4 (Step S7). The coordinate transforming unit 8 transmits the resultant translation axis position 17 on the machine coordinate system to the acceleration/deceleration processing unit 9. The acceleration/deceleration processing unit 9 performs an acceleration/deceleration process on the translation axis position 17 and transmits a process result to the movable unit 10 as driving information output from the numerical control device 1.

As described above, according to the first embodiment, by performing the operation of rotating the rotation axis and changing the tool attitude relative to the machining workpiece, the coordinate system suitable for the present tool attitude can be automatically selected from among the preset coordinate systems. With this operation, the operator can machine the machining surfaces having different normal vectors only by performing the operation of changing the tool attitude so as to make the tool almost perpendicular to each machining surface.

While it has been described in the first embodiment that the tool attitude is expressed by the tool attitude vector 23, it is not necessarily essential. For example, the tool attitude can be expressed by the rotation axis angle 13 itself. When the tool attitude is expressed by the rotation axis angle 13, the coordinate-system selecting unit 5 can determine whether the rotation axis angle 13 transmitted from the command-position generating unit 4 matches a rotation axis angle (hereinafter, "index angle") at which the angle of the Z-axis vector of one of the coordinate systems 16 transmitted from the coordinate-system storage unit 6 is equal to that of the tool attitude vector.

For example, provided that the rotation angle of the B-axis is $\theta_B$, the index angle of the B-axis is $\theta_{B'}$, the rotation angle of the C-axis is $\theta_C$, and the index angle of the C-axis is $\theta_{C'}$, when $\theta_B = \theta_{B'}$, and $\theta_C = \theta_{C'}$ are satisfied, the coordinate-system selecting unit 5 determines that the rotation axis angle on the coordinate system matches the present tool attitude. With the mechanical configuration of the first embodiment, provided that the index angle of the B-axis on a coordinate system stored in the coordinate-system storage unit 6 is $\theta_{B'}$, that of the C-axis is $\theta_{C'}$, and a unit vector in the Z-axis direction is $n=(n_X, n_Y, n_Z)$, the index angles $\theta_{B'}$ and $\theta_{C'}$ are expressed by Equations (4) and (5), respectively.

$$\theta_{B'} = \cos^{-1} n_z \qquad (4)$$

$$\theta_{C'} = \tan^{-1}(n_Y/n_X) \qquad (5)$$

Figure 7A:
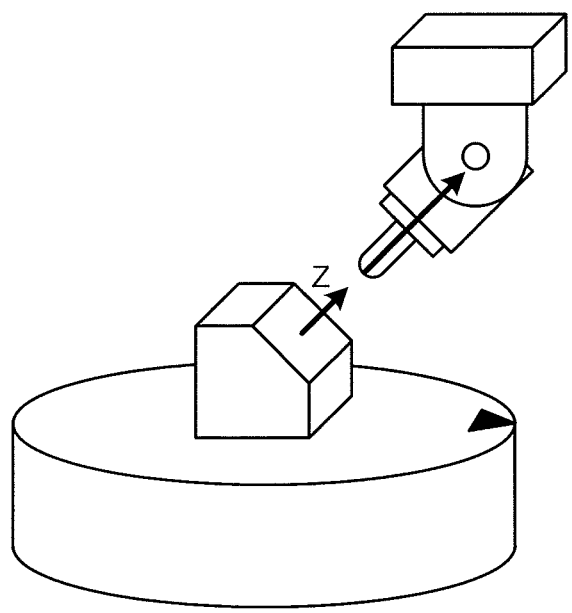
FIG. 7 are explanatory diagrams of an example of an index angle according to the first embodiment of the present invention.
Figure 7B:
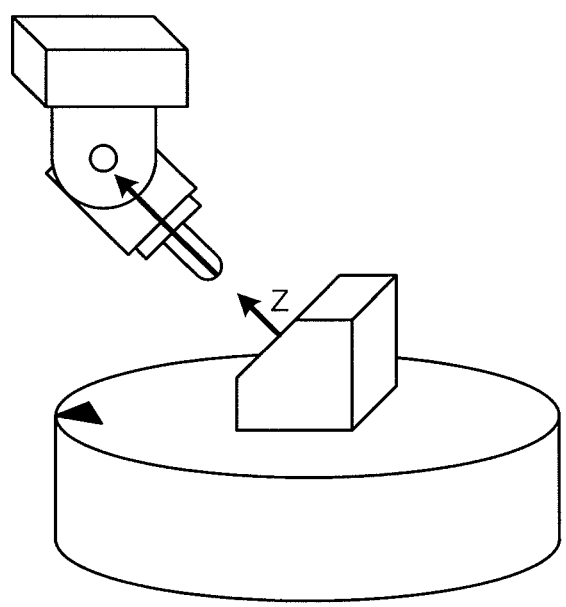

While it is known that an index angle normally has two solutions, the coordinate-system selecting unit 5 can determine that rotation axis angle on the coordinate system matches the present tool attitude as long as one of the two solutions matches the rotation axis angle. FIG. 7 are an example where the index angle according to the first embodiment has two solutions. FIG. 7A depicts a case where the B-axis is at 45 degrees and the C-axis is at 0 degree. FIG. 7B depicts a case where the B-axis is at −45 degrees and the C-axis is at 180 degrees. In both of the cases of FIGS. 7A and 7B, the tool attitude relative to the machining work is the same.

In the first embodiment, it has been described that when a Z-axis vector of one of the coordinate systems 16 is parallel to the tool attitude vector 23, the coordinate system having the Z-axis vector is selected as the selected coordinate system 14. However, this condition is not necessarily essential. For example, even when the Z-axis vector of one of the coordinate systems 16 is not completely parallel to the tool attitude vector 23, it can be determined that the Z-axis vector is parallel to the tool attitude vector 23 as long as the Z-axis vector is under a predetermined allowable angle limit of error. For example, an angle of the predetermined allowable limit is 1 degree or 5 degrees and can be freely set by the user according to the shape, the material or the like of the machining workpiece.

With this configuration, when the multi-spindle machine tool is to machine a machining surface for which it is difficult to calculate index angles, an operator can actuate the machine tool to machine the machining surface on a coordinate system suitable for the machining surface by changing the tool attitude so as to make the tool attitude almost perpendicular to the machining surface. For example, as for the shape, material or the like of a workpiece that can be machined as desired by the user even when the tool attitude is not necessarily perpendicular to a machining surface of the workpiece, an allowable level for selecting the coordinate system can be raised and user's settings can be made simple.

In the first embodiment, it has been described that the coordinate-system selecting unit 5 performs the process in every control cycle. However, this condition is not necessarily essential. For example, the numerical control device 1 can be configured so that the coordinate-system selecting unit 5 performs the process of selecting a coordinate system suitable for machining from among the coordinate systems only when the rotation axis angle 13 changes from that one cycle before. With this configuration, it is possible to eliminate the process of selecting a coordinate system when the rotation axis angle 13 has no change. Therefore, it is possible to reduce process load of the numerical control device 1 when, for example, the multi-spindle machine tool performs machining only by moving the translation axis of a coordinate system.

Moreover, in the first embodiment, the coordinate-system selecting unit 5 selects a coordinate system based on the rotation axis angle 13 at the present tool attitude generated by the command-position generating unit 4. However, the selection criterion is not necessarily the rotation axis angle 13. For example, the coordinate-system selecting unit 5 can select a coordinate system based on a rotation axis angle (not shown) after the acceleration/deceleration processing unit 9 performs the acceleration/deceleration process or on a feedback angle (not shown) transmitted from the movable unit 10. With this configuration, it is possible to exhibit equivalent effects to those attained when the coordinate-system selecting unit 5 selects a coordinate system based on the rotation axis angle 13 at the present tool attitude.

Second Embodiment

In the first embodiment, the case where only one coordinate system suitable for machining is present among the coordinate systems 16 stored in the coordinate-system storage unit 6 in advance and selected by the coordinate-system selecting unit 5 has been described. However, the number of coordinate systems suitable for machining is not necessarily one. For example, the coordinate systems suitable for machining can be stored in the coordinate-system storage unit 6. In a second embodiment of the present invention, a case where two coordinate systems suitable for machining are stored in the coordinate-system storage unit 6 is described by way of example.

Figure 8:
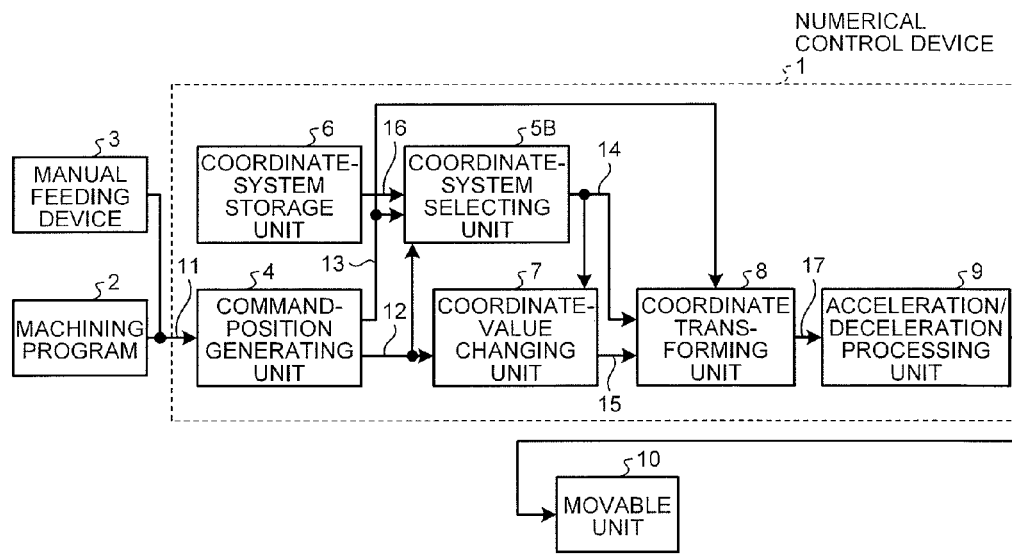
FIG. 8 is a block diagram of a configuration of a numerical control device according to a second embodiment of the present invention.

FIG. 8 is a block diagram of configurations of the numerical control device 1 and peripheral devices thereof according to the second embodiment. In FIG. 8, constituent elements identical to those of FIG. 1 are denoted by like reference signs and explanations thereof will be omitted. In the second embodiment, a coordinate-system selecting unit 5B calculates the tool attitude vector 23 relative to a machining workpiece based on the rotation axis angle 13. The coordinate-system selecting unit 5B compares the calculated tool attitude vector 23 with Z-axis vectors of the coordinate systems 16 transmitted from the coordinate-system storage unit 6, and selects a coordinate system having a Z-axis vector parallel to the present tool attitude vector 23 as the selected coordinate system 14.

At this time, when only one coordinate system having a Z-axis parallel to the tool attitude vector 23 is present or no such a coordinate system is present among the coordinate systems 16 transmitted from the coordinate-system storage unit 6, the coordinate-system selecting unit 5B operates similarly to the coordinate-system selecting unit 5 according to the first embodiment. On the other hand, when the coordinate systems having Z-axes vector parallel to the tool attitude vector 23 are present, the coordinate-system selecting unit 5B selects the coordinate system the Z-axis vector of which is parallel to the tool attitude vector 23 and a position of an origin of which is closest to the present tip point of a tool calculated from the translation axis position 12 as the selected coordinate system 14.

Figure 9:
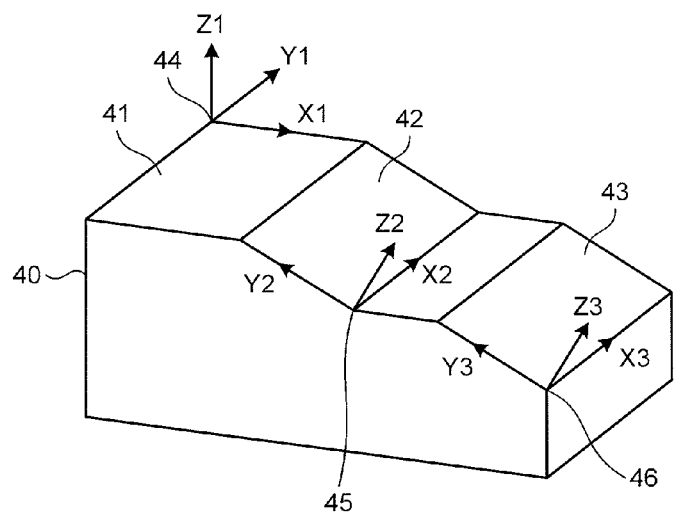
FIG. 9 is an example of a shape of a machining workpiece according to the second embodiment of the present invention.

FIG. 9 is an example of the shape of a machining workpiece according to the second embodiment. In FIG. 9, a first coordinate system 44 for machining a first machining surface 41 of a second machining workpiece 40, a second coordinate system 45 for machining a second machining surface 42, and a third coordinate system 46 for machining a third machining surface 43 are set to the numerical control device 1, that is, stored in the coordinate-system storage unit 6. At this time, a Z-axis vector Z2 of the second coordinate system 45 is parallel to a Z-axis vector Z3 of the third coordinate system 46.

Figure 10A:
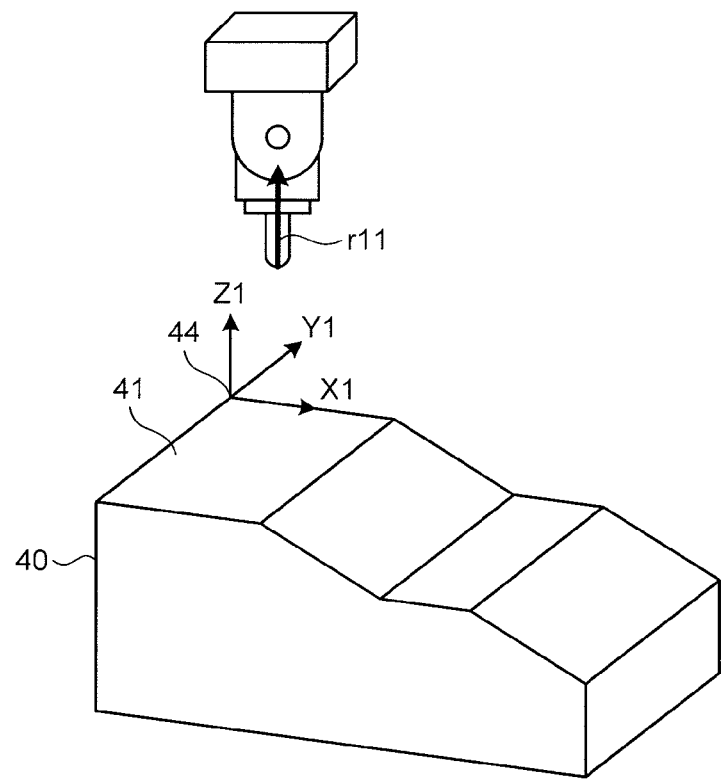
FIG. 10 depict a relationship between a machining workpiece and a tool attitude in the second embodiment of the present invention.

An operation performed by the numerical control device 1 according to the second embodiment is described while referring to a case of machining the first machining surface 41 and the second machining surface 42 of the second machining workpiece shown in FIG. 9. FIG. 10 depict a relationship between the second machining workpiece and the tool attitude in the second embodiment. As shown in FIG. 10A, a case of machining the first machining surface 41 in a state where the tool attitude vector is r11 is considered first. In this case, the first coordinate system 44 is selected as the selected coordinate system 14 because the tool attitude vector r11 is parallel to the Z-axis vector Z1 of the first coordinate system 44.

Figure 10B:
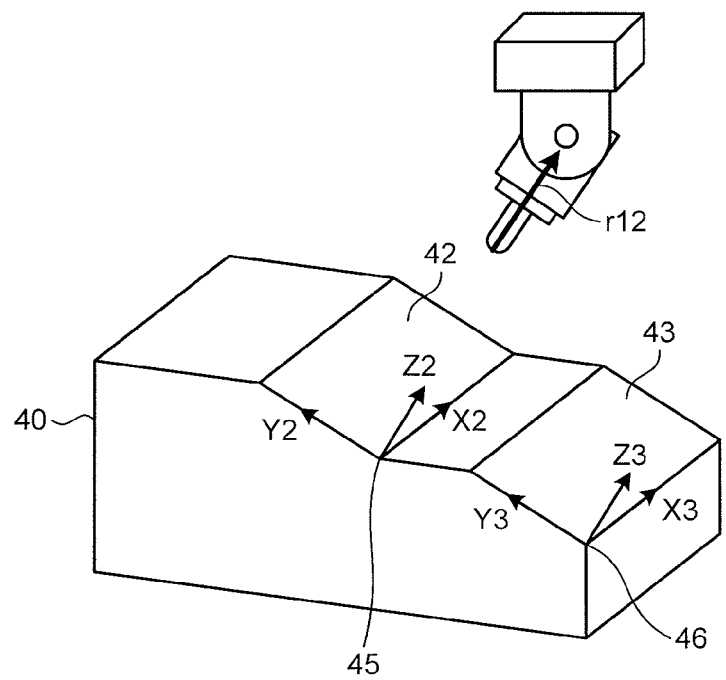

A case of machining the second machining surface 42 is considered next. In this case, as shown in FIG. 10B, the tool attitude vector r12 is parallel to both the Z-axis vector Z2 of the second coordinate system 45 and the Z-axis vector Z3 of the third coordinate system 46. Accordingly, the selected coordinate system 14 cannot be uniquely determined only based on the tool attitude. In this case, therefore, the distance from the tip point position of the tool to the origin of the second coordinate system 45 is compared with that from the tip point position of the tool to an origin of the third coordinate system 46. The coordinate system having the origin for which the distance is smaller is selected as the selected coordinate system 14. That is, in the case of FIG. 10B, the second coordinate system 45 is selected as the selected coordinate system 14.

As described above, according to the second embodiment, even when the coordinate systems suitable for the present tool attitude vector are stored in the coordinate-system storage unit 6, the coordinate-system selecting unit 5B can select the coordinate system the origin of which is closest to the present tip point position of the tool. Accordingly, even when the coordinate systems equal in Z-axis vector are registered, an operator can actuate a machine tool to machine the machining surfaces having different normal vectors only by performing the operation of changing the position and attitude of the tool.

In the second embodiment, it has been described that two coordinate systems suitable for machining are stored in the coordinate-system storage unit 6. However, the number of coordinate systems suitable for machining is not necessarily two. For example, the number of coordinate systems suitable for machining can be set three or four or more. An arbitrary number of coordinate systems suitable of machining can be set as long as the numerical control device 1 is configured so that the coordinate-system selecting unit 5B selects the coordinate system the origin of which is closest to the present tip point position of the tool from among the coordinate systems. With this configuration, a machining surface closer to the tip point position of the tool is always machined, thereby making it possible to reduce the entire machining time, for example.

In the second embodiment, it has been described that the coordinate-system selecting unit 5B selects the coordinate system the position of the origin of which is closest to the present tip point position of the tool when selecting one from among the coordinate systems having Z-axis vectors parallel to the tool attitude vector. However, this selection method is not necessarily essential. For example, the coordinate-system selecting unit 5B can select a coordinate system the position of the origin of which is closest to a position obtained by projecting the present tip point position of the tool onto the XY plane of one of the coordinate systems as the selected coordinate system 14. With this configuration, the operator can actuate the machine tool to machine the machining surfaces having different normal vectors only by performing the operation of changing the position and attitude of the tool.

In the second embodiment, the coordinate-system selecting unit 5B selects the coordinate system based on the rotation axis angle 13 at the present tool attitude generated by the command-position generating unit 4. However, the selection criterion is not necessarily the rotation axis angle 13. For example, the coordinate-system selecting unit 5B can select a coordinate system based on a rotation axis angle (not shown) after the acceleration/deceleration processing unit 9 performs an acceleration/deceleration process or on a feedback angle (not shown) transmitted from the movable unit 10. With this configuration, it is possible to exhibit equivalent effects to those attained when the coordinate-system selecting unit 5B selects a coordinate system based on the rotation axis angle 13 at the present tool attitude.

In the second embodiment, it has been described that the present tip point position of the tool used by the coordinate-system selecting unit 5B is calculated using the translation axis position 12 generated by the command-position generating unit 4. However, the present tip point position of the tool can be not necessarily calculated using the translation axis position 12. For example, it is possible to exhibit equivalent effects to those when the present tip point position of the tool is calculated using the translation axis position 12 even by calculating the present tip point position of the tool using the rotation axis angle (not shown) after the acceleration/deceleration processing unit 9 performs the acceleration/deceleration process or on the feedback angle (not shown) transmitted from the movable unit 10.

Further, in the second embodiment, the coordinate-system selecting unit 5B selects the coordinate system the position of the origin of which is closest to the present tip point position of the tool or to the position obtained by projecting the present tip point position of the tool onto the XY plane of one of the stored coordinate systems. However, this selection method is not necessarily essential. For example, the coordinate-system selecting unit 5B can select a coordinate system the distance of the origin of which from the present tip point position of the tool is under an allowable level. Alternatively, the coordinate-system selecting unit 5B can select a coordinate system the distance of the origin of which from the position obtained by projecting the present tip point position of the tool onto the XY plane of one of the stored coordinate system is under an allowable level. With this configuration, the coordinate-system selecting unit 5B can select a desired coordinate system even when the distance between origins of the coordinate systems suitable for the tool attitude is small.

INDUSTRIAL APPLICABILITY

The present invention can be utilized, in technical fields such as machine tools, for a device that controls a multi-spindle machine tool including a rotation axis and controlling the position and attitude of a tool.

The invention claimed is:

1. A numerical control device for a multi-spindle machine tool comprising a tool which rotates about a rotation axis and controlling an attitude of the tool relative to a machining workpiece, the numerical control device comprising:
a first storage device capable of recording a machining program;
a second storage device capable of recording coordinate systems; and
a central processing unit capable of executing the machining program, generating a translation axis position of the tool and a rotation axis angle of the tool in every control cycle based on a moving command input from the machining program or a manual feeding device, selecting a coordinate system suitable for the tool attitude from among the coordinate systems stored in the second storage device based on the rotation axis angle, changing the translation axis position of the tool to a translation axis position on the selected coordinate system, performing a coordinate transformation to transform the obtained translation axis position on the selected coordinate system into a translation axis position on a machine coordinate system based on the obtained translation axis position on the selected coordinate system and the rotation axis angle, and outputting the obtained translation axis position on the machine coordinate system as data for machining the machining workpiece on the selected coordinate system,
wherein the central processing unit determines that the coordinate system is suitable for the tool attitude when the rotation axis angle matches a rotation axis angle at which a tool attitude vector is perpendicular to an XY plane on one of the coordinate systems.

2. A numerical control device for a multi-spindle machine tool comprising a tool which rotates about a rotation axis and controlling an attitude of the tool relative to a machining workpiece, the numerical control device comprising:
a command-position generating unit that generates a translation axis position of the tool and a rotation axis angle of the tool in every control cycle based on a moving command input from a machining program or a manual feeding device;
a coordinate-system storage unit that stores a plurality of coordinate systems;
a coordinate-system selecting unit that selects a coordinate system suitable for the tool attitude from among the coordinate systems based on the rotation axis angle;
a coordinate-value changing unit that changes the translation axis position of the tool to a translation axis position on the coordinate system selected by the coordinate-system selecting unit; and
a coordinate transforming unit that transforms the translation axis position on the selected coordinate system into a translation axis position on a machine coordinate system based on the translation axis position on the selected coordinate system and the rotation axis angle,
wherein the coordinate-system selecting unit determines that the coordinate system is suitable for the tool attitude when the rotation axis angle matches a rotation axis angle at which a tool attitude vector is perpendicular to an XY plane on one of the coordinate systems.

3. The numerical control device according to claim 2, wherein the coordinate-system selecting unit determines that the coordinate system is suitable for the tool attitude when a tool attitude vector calculated based on the rotation axis angle is parallel to a Z-axis direction vector of one of the coordinate systems.

4. The numerical control device according to claim 2, wherein the coordinate-system selecting unit further selects a coordinate system suitable for the tool attitude and having an origin closest to a position obtained by projecting a tip point of the tool onto an XY plane on the coordinate system suitable for the tool attitude when a plurality of coordinate systems suitable for the tool attitude are registered.

5. The numerical control device according to claim 2, wherein the coordinate-system selecting unit further selects a coordinate system suitable for the tool attitude and having an origin closest to a position of a tip point of the tool when a plurality of coordinate systems suitable for the tool attitude are stored.

6. A method of controlling a numerical control device for a multi-spindle machine tool comprising a tool which rotates about a rotation axis and controlling an attitude of the tool relative to a machining workpiece, the method comprising:
a step of generating a translation axis position of the tool and a rotation axis angle of the tool in every control cycle based on a moving command input from a machining program or a manual feeding device;
a step of selecting a coordinate system suitable for the tool attitude from among a plurality of coordinate systems stored in advance based on the rotation axis angle;
a step of changing the translation axis position of the tool to a translation axis position on the selected coordinate system; and
a step of transforming the translation axis position on the selected coordinate system into a translation axis position on a machine coordinate system based on the translation axis position on the selected coordinate system and the rotation axis angle, wherein the step of selecting the coordinate system comprises determining that the coordinate system is suitable for the tool attitude when the rotation axis angle matches a rotation axis angle at which a tool attitude vector is perpendicular to an XY plane on one of the coordinate systems.

* * * * *